US012762180B2

(12) United States Patent
Au et al.

(10) Patent No.: US 12,762,180 B2
(45) Date of Patent: Oct. 13, 2026

(54) GENERATIVE WEATHER IMAGING FOR CLIMATE PREDICTION

(71) Applicant: Fujitsu Limited, Kawasaki (JP)

(72) Inventors: Wing Yee Au, Saratoga, CA (US); Hon Yung Wong, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 19/096,428

(22) Filed: Mar. 31, 2025

(65) Prior Publication Data

US 2026/0300381 A1 Oct. 1, 2026

(51) Int. Cl.
*G06F 16/535* (2019.01)
*G06F 16/55* (2019.01)

(52) U.S. Cl.
CPC ............ *G06F 16/535* (2019.01); *G06F 16/55* (2019.01)

(58) Field of Classification Search
None
See application file for complete search history.

(56) References Cited

U.S. PATENT DOCUMENTS

| | | | | |
|---|---|---|---|---|
| 10,996,374 | B1 | 5/2021 | Nazir | |
| 2010/0002077 | A1* | 1/2010 | Viggiano | G06F 16/337 |
| 2017/0357029 | A1* | 12/2017 | Lakshmanan | G06F 16/535 |
| 2017/0371074 | A1* | 12/2017 | Elkabetz | G06F 16/90 |
| 2018/0330435 | A1* | 11/2018 | Garg | G06F 16/29 |
| 2020/0309993 | A1* | 10/2020 | Ganshin | G06F 16/53 |
| 2021/0350235 | A1* | 11/2021 | Levi | G06F 16/53 |
| 2025/0124639 | A1* | 4/2025 | Tran | G06F 16/20 |

FOREIGN PATENT DOCUMENTS

| | | | |
|---|---|---|---|
| AU | 2020361129 | A1 | 3/2022 |

OTHER PUBLICATIONS

Crum "The WSR-88D and the WSR-88D Operational Support Facility" 1993.
Author Unknown "Beginner's Guide to GOES-R Series Data" 2016.
Trenkle "Joint Polar Satellite System" 2011.
Helmus "The Python ARM Radar Toolkit (Py-ART), a Library for Working with Weather Radar Data in the Python Programming Language" 2016.
Raspaud et al. "An Open-Source, Community-Driven Python Framework to Process Earth Observation Satellite Data" 2018.

(Continued)

*Primary Examiner* — Son T Hoang
(74) *Attorney, Agent, or Firm* — Maschoff Brennan

(57) ABSTRACT

According to an aspect of an embodiment, a method includes obtaining first real-time observational data corresponding to current weather conditions in or near a specified location. The first real-time observational data is obtained based on the first real-time observational data corresponding to surface observations in, on or near the specified location. A virtual weather surveillance image (WSR) image of the specified location is generated using an artificial intelligence (AI) radar image generation model and based on the first real-time observational data. The method can further include generating one or more climate profiles for the specified location based on the virtual WSR image, the first real-time observational data, and one or more contemporaneous satellite images of the specified location.

18 Claims, 12 Drawing Sheets

(56) References Cited

OTHER PUBLICATIONS

Zhang et al, "Multi-Radar Multi-Sensor (MRMS) Quantitative Precipitation Estimation" 2016.
Dowell et al, "The High-Resolution Rapid Refresh (HRRR): An Hourly Updating Covection-Allowing Forecast Model, Part I: Motivation and System Description" 2022.
Van Nooten et al, "Improving Precipitation Nowcasting for High-Intensity Events Using Deep Generative Models with Balanced Loss and Temperature Data: A Case Study in the Netherland" Oct. 2023.
Stock, "Attention-Based Scattering Network for Satellite Imagery" Oct. 2022.
Nvidia "Disaster Risk Monitoring Using Satellite Imagery" 2022.
Andrychowicz et al, "Deep Learning for Day Forecasts from Sparse Observations" Jun. 2023.
Ravuri et al, "Skillful Percipitation Nowcasting using Deep Generative Model for Radar" Apr. 2021.
Lam et al, "GraphCast: Learning Skillful Medium-Range Global Weather Forecasting" Aug. 2023.
Li et al. "Seeds: Emulation of Weather Forecast Ensembles with Diffusion Models" Oct. 2023.
European Search Report dated Jul. 13, 2026 as received in application No. 26151757.7.

* cited by examiner

GENERATIVE WEATHER IMAGING FOR CLIMATE PREDICTION

FIELD

The embodiments discussed in the present disclosure are related to creation of weather data including climate profiles and maps using radar imagery.

BACKGROUND

Climate change can have a direct impact on human life and economic activities. Many instruments and sensing devices are often placed on land, on or in the oceans or on other bodies of water, in the skies, or in space. Such instruments and sensing devices can produce huge amounts of data, which is then cleaned, combined and assimilated into weather prediction models such as Numerical Weather Prediction (NWP). The accuracy of weather predictions in various locations can have a significant impact on many businesses and industries, such as agriculture, insurance, utilities, and municipalities. However, such weather prediction models are often slow and computationally expensive and may not be available in all regions.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes obtaining first real-time observational data corresponding to current weather conditions in or near a specified location, the first real-time observational data being obtained based on the first real-time observational data corresponding to surface observations in, on or near the specified location. A virtual weather surveillance image (WSR) image of the specified location is generated using an artificial intelligence (AI) radar image generation model and based on the first real-time observational data. The method can further include generating one or more climate profiles for the specified location based on the virtual WSR image, the first real-time observational data, and one or more contemporaneous satellite images of the specified location.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
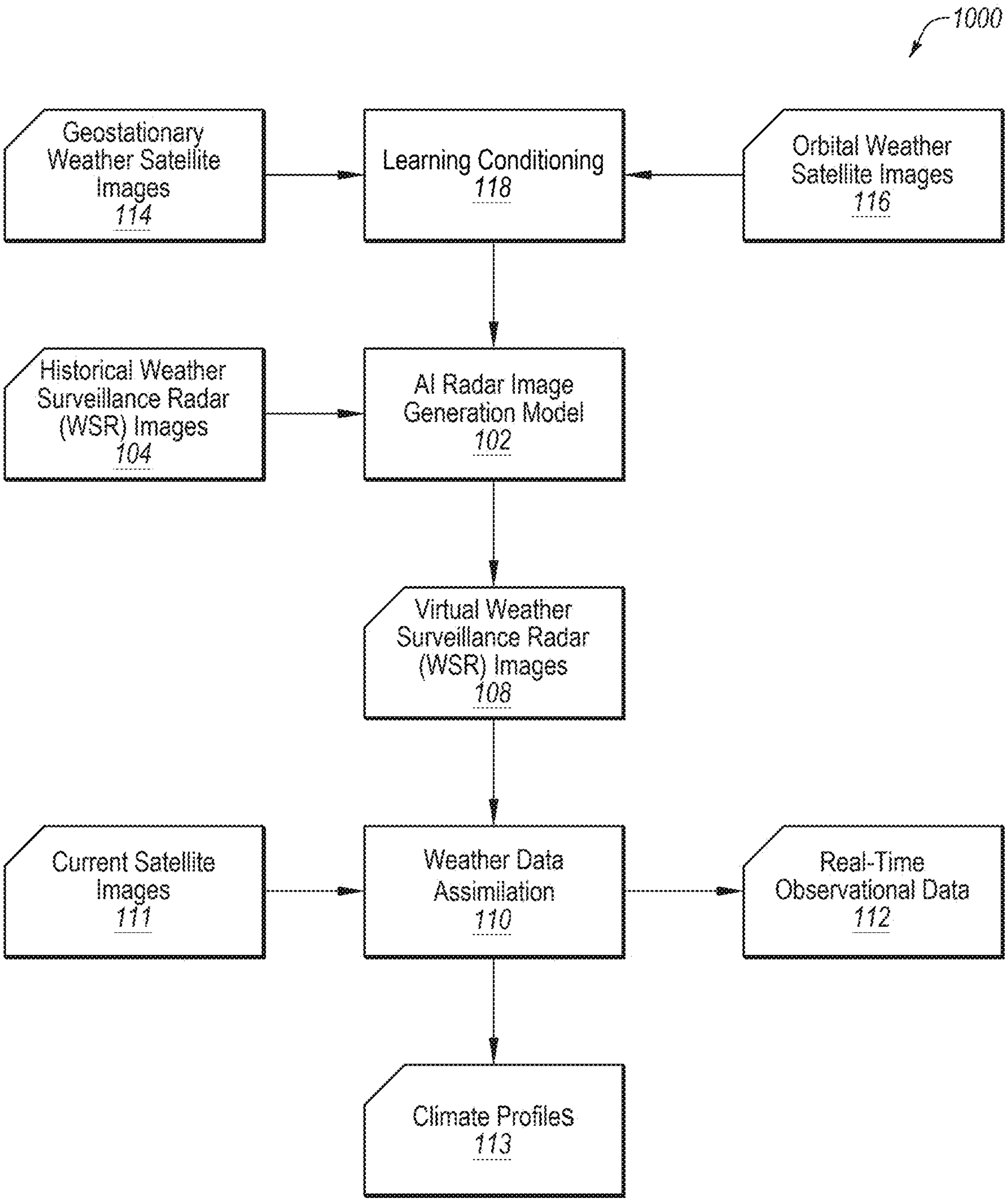
FIG. 1 illustrates an example process configured to generate climate profiles for a specified location, in accordance with at least one embodiment of the present disclosure.

Climate change and weather conditions can have a significant impact on human life and economic activities. In addition, against the background of multiple converging societal issues such as declining birthrates and aging populations, global warming, and economic disparity, it is becoming increasingly complex to make effective policy decisions. Given the fast pace of the world economy today, it can be important to minimize the risks of increased costs and time losses due to failures when implementing policies in the real world. Thus, if it is possible to understand the effects and impacts of a climate change or climate events on a particular business or governmental policy or practice in advance, the impacts of various policy changes can be explored to determine an optimal policy.

Understanding climate impacts is therefore of increasing importance for many industries such as insurance companies, agriculture, and forestry, many of which operate in rural and underdeveloped locations as well as urban locations. In addition, municipalities and companies that face various social issues such as $CO_2$ reduction, congestion and traffic jams, urban design, and facility integration and closure, are making efforts to improve these issues and seek to understand the impacts climate events can have.

For this reason, many instruments and sensing devices for detecting weather and climate patterns have been developed and deployed by businesses, international organizations and national governmental and other agencies on land, sea, sky, and space, often at significant effort and expense. These instruments and sensing devices produce huge amounts of data, which is cleaned, combined and assimilated into models for Numerical Weather Prediction (NWP). Such physics-based weather simulation modeling (e.g., using supercomputers), while accurate, can be slow and extremely computationally expensive. For example, well-known weather forecasting methods (e.g., the Multi-Radar Multi-Sensor (MRMS) and U.S. National Oceanic and Atmospheric Administration's (NOAA) High-Resolution Rapid Refresh (HRRR) models) assimilate WSR and satellite image data, as well as on-the ground weather data observation (temperature, rainfall, barometric pressure, etc.) and utilize well-developed physics-based models running on supercomputers. Such climate models, given their reliance on data intensive Doppler radar and satellite imagery, can have a limited geospatial coverage, mostly focused on the United States, Western Europe, and Japan.

With the advent of artificial intelligence (AI) and machine learning (ML), large quantities of historical weather data can be used to train ML models. Such machine learning models can provide weather prediction and climate profiles with faster prediction times and higher accuracies than the traditional physics-based NWP approaches. For example, weather data assimilation by government agencies around the world often rely on computationally intensive physical modeling combined with expert knowledge. In some embodiments of the disclosure, the weather assimilation process can utilize machine learning-based classification and regression to approximate the assimilation process to achieve faster predictions at lower computational cost.

Current AI weather forecasting approaches often focus on using highly assimilated or reanalysis data, with the main goal being the ability to provide faster predictions, within a matter of minutes. Short-term precipitation forecasting, e.g., "nowcasting" from the present up to 6 hours, can be useful for downstream mobile apps and is a common use case, but can be compute intensive with availability limited to advanced economies in the US and Western Europe. However, weather forecasting use cases having a geospatial focus on remote or less-well covered locations on earth that are outside the US, Western Europe, and Japan are increasingly important and may need to utilize surface weather data that is reported from the ground, and/or unassimilated radar and satellite imagery that is more widely accessible to remote locations.

Thus, there is a need for use of generative AI in climate profiling to benefit underdeveloped regions. Developing regions of the world often do not have access to sophisticated and expensive weather observation instruments and sensing devices, such as Doppler radars generating weather surveillance radar (WSR) images. Thus, virtual Doppler radar images, which are AI generated based on historical radar images, can be useful in climate profiling and weather prediction applications in both developed and developing regions of the world. Such virtual Doppler radar images can be conditioned with parameters to enhance the accuracy of the predictions and climate profiles for a given region. For example, when a region of interest does not have access to Doppler radar images, parameters such as satellite images, topographical information, and surface weather conditions that are available for the region of interest can be used to condition virtual radar images (which may be generated based on historical radar images that are only available for regions that are covered by the radar instruments) to generate credible weather data grounded with real historical data for the region of interest. Having generated data also allows for better hazard predictions in less developed regions with limited ground observations.

In addition, performing simulations of human and social behavior in a digital space before implementing policy changes and incorporating climate and weather as elements in such simulations of real-world scenarios in traffic, utility generation and transmission, and in business and governmental operations, increases the realism of the simulations, and can benefit businesses and governments worldwide. Having a generative AI mechanism for such elements can provide better coverage of "what-if" scenarios, and influence better downstream decision making. This is true particularly with the increasing occurrence of extreme weather conditions that did not historically exist.

According to one or more embodiments of the present disclosure, a climate profiling system may be configured in a manner to allow creation of virtual weather surveillance radar (WSR) images extracted from historical Doppler radar data, on areas that have no existing Doppler radar coverage. In particular, as described in detail in the present disclosure, the climate profiling and weather prediction system may be configured such that the system utilizes an artificial intelligence (AI) radar image generation model configured to generate virtual WSR images conditioned to match specified weather events and static parameters including season, location, topography, and land-water vicinity. For example, the AI radar image generation model generates the weather condition forecasts based not only on real-time observational data but also satellite image data. In this manner, the AI radar image generation model is able to tolerate sparsity of absence of real-time surface weather observation data, since the model can also incorporate real-time (or near real-time) satellite image data which is publicly available for many locations around the world. Such use of the AI forecasting model may help generate weather condition forecasts that are timely and localized with a geospatial focus that can also be used in business and policy simulations. Such a climate profiling system can provide a lower-cost (e.g., using graphical processing units (GPUs) rather than supercomputing) and scalable solution, which offers geospatial coverage in many locations around the world with weather prediction focusing on both precipitation and wind events.

Embodiments of the present disclosure will be explained with reference to the accompanying drawings.

FIG. 1 illustrates an example system 1000 configured to generate climate profiles for a specified location, in accordance with at least one embodiment of the present disclosure. In general, the system 100 can be configured to generate one or more climate profiles 113 for a specified location anywhere in the world. The system 100 can be implemented at the specified location or at another location anywhere in the world.

In some embodiments, the process 1000 can include an artificial intelligence (AI) image generation model 102 trained using a historical weather surveillance radar (WSR) image dataset 104. The training of the AI radar image generation model 102 is described further below with respect to FIG. 2. In some embodiments, the AI radar image generation model 102 can include any suitable machine learning models such as deep learning accelerators (DLAs), neural networks, convolutional neural networks (CNNs), regional convolutional neural networks (RCNNs), generative models, physics-informed neural networks, transformers, neural operator models, etc.

In some embodiments, the generative AI radar image generation model 102 is conditioned by learning conditioning model 118. Learning conditioning model 118 takes additional information such as geostationary weather satellite image data 114 and orbital weather satellite image data 116 associated with the historical WSR image dataset 104 and associates a probability distribution of weather event data to surface observations and the local environment, to make differentiated and realistic generated images (e.g., virtual WSR images) 108. These generated virtual WSR images 108 take the place of actual WSR images (e.g. historical WSR image datasets 104) which are not available in many locations. Virtual WSR images 108 can further be assimilated with real-time observational weather data (e.g., current satellite images 111 and real-time observational data 112) using weather data assimilation module 110, to generate one or more climate profiles 113. In one embodiment, the real-time observational data 112 can include surface weather observations, such as current weather station data (e.g., surface temperature, humidity), as well as topographic information that can include geographic features of a specified location (e.g., hills, plains, lakes, rivers, oceans) and/or urban or other human-made landscape features.

In some embodiments, the historical WSR image dataset 104 includes historical radar image and weather analysis data obtained from various sources, such as the NEXRAD system in the United States, as well as other sources in various locations including the United States and Europe. For example, the historical WSR image dataset 104 can include historical radar image data available from the National Centers for Environmental Information (NCEI) at NOAA. In one example, weather surveillance radar (WSR) is a Doppler radar that provides surface weather data, from which images related to precipitation and wind in a 200 nautical mile radius can be extracted and interpreted for weather analysis. The historical WSR image dataset 104 obtained from NCEI is derived from e.g., weather surveillance radars (WSRs) including a network of 160 high-resolution S-band Doppler weather radars in the Next Generation Radar (NEXRAD) system in the United States. NEXRAD is operated by the National Weather Service (NWS), the Federal Aviation Administration (FAA) and the U.S. Air Force. The historical WSR image dataset 104 includes such data over a time period. For example, the historical WSR image dataset 104 can include weather conditions data over five years, 10 years, fifteen years, twenty years, etc.

Modifications, additions, or omissions may be made to the system 1000 without departing from the scope of the present disclosure. For example, in some embodiments, the process 1000 may include any number of other components that may not be explicitly illustrated or described.

Figure 2:
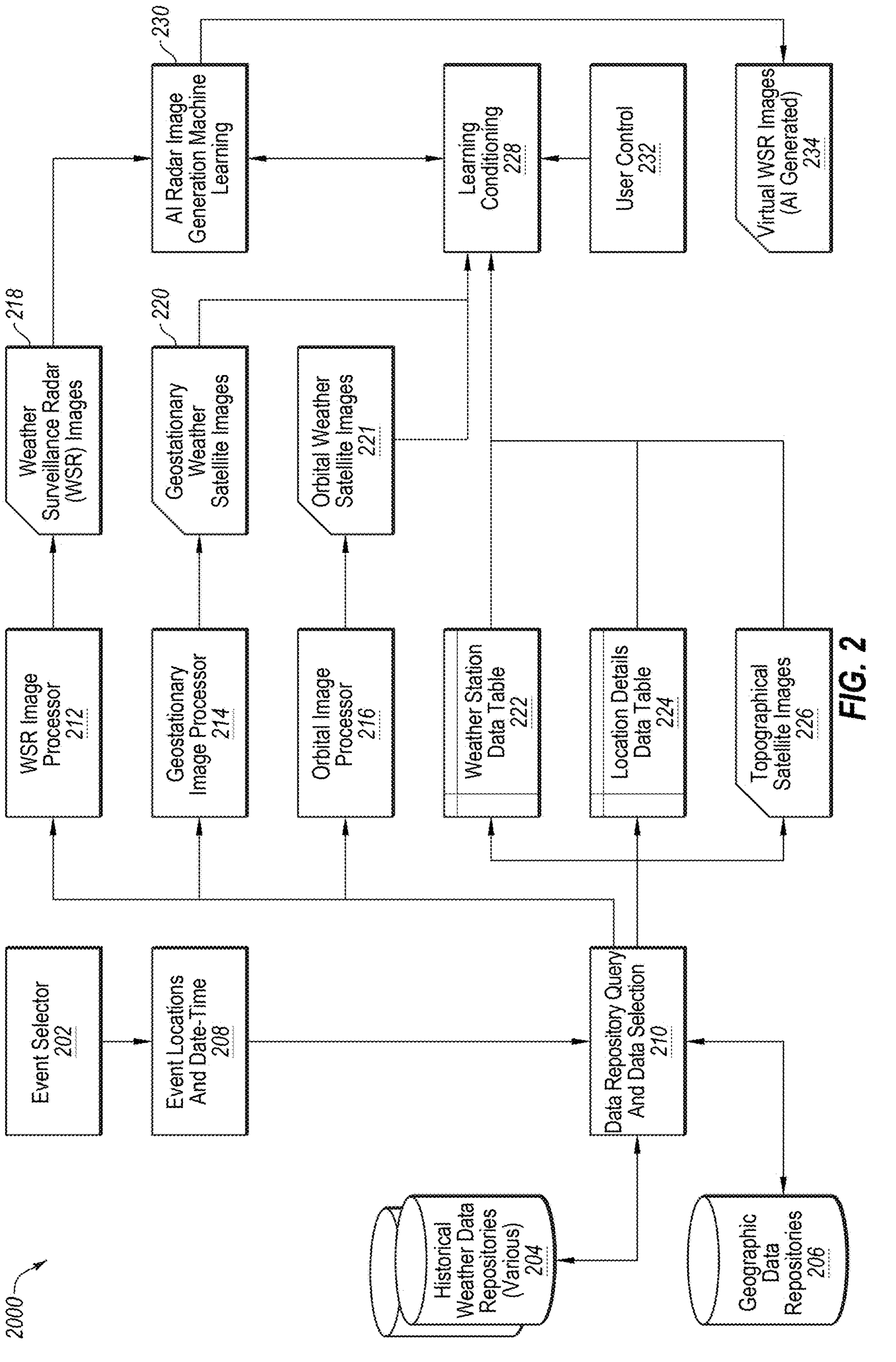
FIG. 2 illustrates an example process configured to train an image generation machine learning model, arranged in accordance with one or more embodiments of the present disclosure.

FIG. 2 illustrates an example process 2000 configured to train an image generation machine learning model, arranged in accordance with one or more embodiments of the present disclosure. In some embodiments, event selector 202 (which is described in further detail with respect to FIGS. 3A and 3B below) generates one or more weather event search results 208 (e.g., listed by event type, location, date, time, etc.) for training the AI radar image generation machine learning model 230 to generate virtual WSR images 234 for use in generating one or more climate profiles 113 as shown in FIG. 1. In some embodiments, WSR images used to train the machine learning model are selected by one or more criteria, including (1) a list of weather events of interest, (2) a list of regions of interest, and (3) a date range. The weather event search results 208 are used to query the weather data repositories 204 and the geographic data repositories 206 at the data repository query and data selection module 210.

For example, in one study the weather events of interest can include: hurricanes, tornadoes, heavy rains, and high winds. In this example, the regions of interest can include the following locations in the United States: San Francisco, California; Denver, Colorado; Kansas City, Missouri; and Richmond, Virginia. In addition, the date range in this example can include any dates in the calendar years 2020-2023. However, it is clear that the event selector 202 need not be limited by any particular weather events, regions, or date ranges, and event selector 202 can select any weather events, regions, or date ranges for which WSR images from one or more repositories 204 are available. Although some examples discussed herein are specific to the United States, embodiments of the disclosure can be applied or expanded to include other regions of the world. For example, Europe and Japan have WSR and other weather data repositories that contain data relating to weather events of interest discussed above (and possibly other weather events), for regions in Europe and Japan respectively, and for date ranges that are equally applicable to the disclosure.

In some examples, the capability of the disclosure can extend to at least 49 weather event types defined in the National Centers for Environmental Information (NCEI) Storm Events Database of the U.S. NOAA, any regions served by any of the 160 weather surveillance radars (WSRs) within the NEXRAD system, and any date back to at least 2018 as provided in the Geostationary Operational Environmental Satellites (GOES) open data repositories. In these and other examples, GOES are satellites that orbit the Earth at speeds equal to the Earth's rotation, allowing each satellite to maintain its position over a specific geographic region, which can cover much of the Earth's surface, including at least the entire Western Hemisphere and much of the Pacific Ocean. Other relevant data that may impact the event selector 202 includes data from the Joint Polar Satellite System (JPSS), which orbits the Earth and travels from the North Pole to the South Pole 14 times a day and provides data over the whole globe twice per day. Equipment on GOES and JPSS provides data from the Earth emitting at different wavelengths (e.g., visible, infrared and microwave), from which images relevant to many weather elements, such as temperature, water vapor, and cloud cover, are extracted and interpreted for weather analysis. GOES and JPSS data and/or images can in some examples also be included in weather data repositories 204 and/or geographic data repositories 206, although such data repositories can include satellite data and/or images from other geostationary and polar orbital weather satellites operated by the United States and other countries.

As shown in FIG. 2, data repository query and data selection module 210 routes the appropriate data and/or images to WSR image processor 212 (e.g., for NEXRAD data), geostationary image processor 214 (e.g., for GOES data), and orbital image processor 216 (e.g., for JPSS data). Image processors 212, 214, and 216 create ensembles of WSR images 218, geostationary weather satellite images 220, and orbital weather satellite images 221 that can be: (1) indicative of severe weather events as selected by the event selector 202, and (2) are time and spatially aligned to the relevant location(s) and dates/times. In some examples, WSR image processor 212 can be implemented using the Python ARM Radar Toolkit (Py-ART), a Python package for interpreting WSR data. In some examples, PyTroll, an open-source Python framework for the processing of earth observation satellite data, with Satpy as a frontend, are Python packages that can be used to implement geostationary weather satellite and orbital weather satellite image processors 214 and 216 to interpret GOES and JPSS data. Satpy is a Python library designed for reading and manipulating meteorological remote sensing data, including satellite data. In one example, image processors 212, 214, and 216 generate images 218, 220, and 221 respectively for machine learning, and also crop and align the images based on latitude and longitude, as well as timestamp. In some examples, image processors 212, 214, and 216 analyze the image data routed by data selection module 210 and generate images 218, 220, and 221 that are aligned in time and location (e.g., depict the same area such that the images are aligned using latitude and longitude coordinates, and align the images so that each of the three images shows the area at a simultaneous or near-simultaneous timestamp). Image processors 212, 214, and 216 can further crop images 218. 220, and 221 to ensure the images depict the same size and same area, with the same location coordinates. Images 218, 220, and 221, once aligned and cropped to depict the same location and the same area, at the same time, can be effectively used in learning conditioning module 228 to help generate an appropriate virtual WSR image as described below.

Images 218, 220, and 221 are included as data sources for the generative AI components: AI radar image generation machine learning model 230 and learning conditioning model 228. AI radar image generation machine learning model 230 receives time and spatially aligned WSR images 218 as input, while learning conditioning module 228 receives time and spatially aligned geostationary weather satellite images 220 and orbital weather satellite images 221, as well as other data relevant to weather prediction and climate profiling. Such other relevant data can in some examples include weather station data table 222, location details data table 224, and topographical satellite data images 226 that are relevant to the selected events, locations, and dates/times. Learning conditioning module 228 provides this additional information 222, 224, and 226 to condition the generative AI machine learning model 230 to associate the probability distribution of the event data to surface observations and the local environment to help generate differentiated and realistic generated (virtual) WSR images for a specific location, even if there are no historical WSR images available for that specific location. The generated images can replace real WSR images used to assimilate with satellite and on-the-ground weather data for climate profiling, as described above with respect to FIG. 1. In some examples, user control 232 can provide a user interface that can be used to tune the learning conditioning parameters.

Modifications, additions, or omissions may be made to the system 2000 without departing from the scope of the disclosure. For example, the operations of the system 2000 may be implemented in differing order. Additionally, or alternatively, two or more operations may be performed at the same time. Furthermore, the outlined components, modules, operations and actions are provided as examples, and some of the components, modules, operations and actions may be optional, combined into fewer components, modules, operations and actions, or expanded into additional components, modules, operations and actions without detracting from the essence of the disclosed embodiments.

Figure 2A:
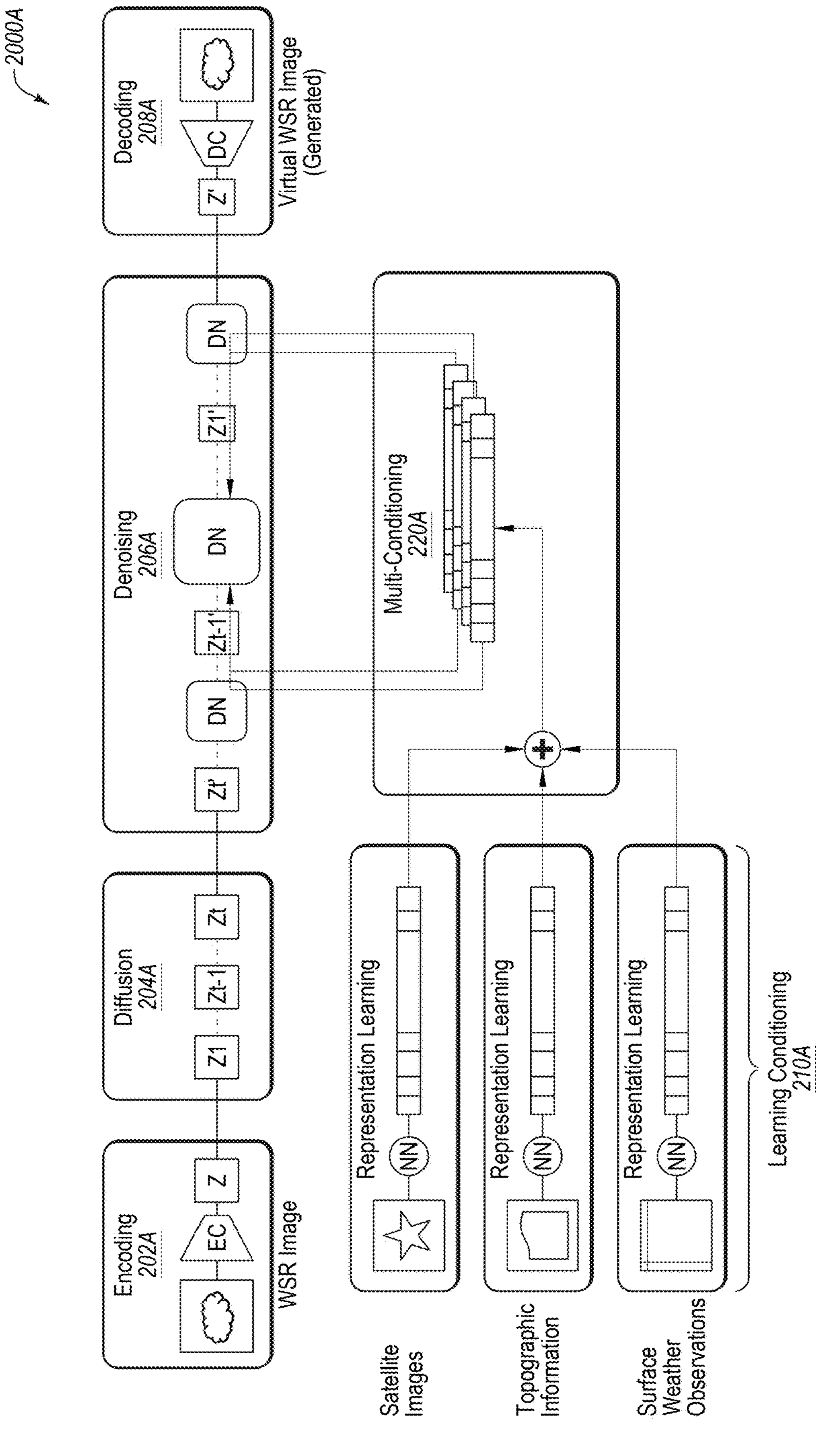
FIG. 2A illustrates an example artificial intelligence radar image generation process, arranged in accordance with one or more embodiments of the present disclosure.

FIG. 2A illustrates an example artificial intelligence radar image generation process 2000A, arranged in accordance with one or more embodiments of the present disclosure. In some embodiments, a diffusion-based generative AI model such as a latent diffusion model (LDMs) is used. Image synthesis using LDMs to reduce diffusion-based model's computation demands, while increasing the generated image's quality, is described in Robin Rombach, Andreas Blattman, et al. CVPR '22, Conference on Computer Vision and Pattern Recognition, Year 2022, Pages 10674-10685, (https://arxiv.org/pdf/2112.01752), which is incorporated herein by reference in its entirety. Rombach et al. describes a LDM that compresses image data and then denoises the data in a smaller latent space, reducing the amount of resources used for both training and sampling stages.

In one embodiment, a general purpose, perceptually focused LDM encoder 202A projects a high-quality image (e.g., a WSR image) from pixel space to a lower dimensionality, semantically equivalent, latent space (e.g., as representation Z) by adding Gaussian noise in diffusion process 204A. Through a series of training steps in the diffusion process 204A, with the addition of noise at every step, the image generation machine learning model can be trained using images generated in the semantically equivalent latent space.

In one example, denoising process 206A can utilize a U-Net deep learning architecture having a cross-attention mechanism that can inject into the denoising process 206A relevant attributes (e.g., spatial features) from learning conditioning 210A, including satellite images, topographic information, and, and surface weather observations which are concatenated into multiple U-Net stages through multi-conditioning module 220A. As such, the denoising process is conditioned by multiple attributes from the learning conditioning 210A, so that the generative latent representation Z' may match the specified conditions. The generated latent representation Z' is decoded to virtual WSR images that match the specified conditions at decoder 208A.

In some embodiments of the disclosure, adapting this methodology to the weather imaging domain, the specified condition is the location (e.g., latitude and longitude values), and date-time information. In some examples, the location can be a place with no WSR image data available, and such embodiments can provide virtual WSR images that can be used to predict weather conditions more accurately. In addition, in some examples, the date-time information may be derived from historic surface weather conditions that the user desires to match for weather prediction (in which case the user can utilize user control 232 in FIG. 2 to set the training conditions). For example, the user may wish to provide date, time and location information on historical weather events having actual WSR image data and other relevant weather data during the training process 2000A. In such examples, the user would input data (using user control 232) on those historical weather events that are similar to weather events that the user is interested in predicting.

One example of a multi-condition model schema that can be adapted for use in embodiments of artificial intelligence radar image generation model and learning conditioning system 2000A is described in Giuseppe Lisanti, Nico Giambi, University of Bologna, Computer Vision and Image Understanding, Volume 244, July 2024, 1040206 (http://arxiv.org/2306.00914). Based on the specified conditions, in some embodiments additional information can be incorporated into learning conditioning 210A and multi-conditioning module 220A to generate better matching virtual WSR images. Cross-attention, as used in some embodiments of the disclosure, allows more flexible control over the generated images, enabling multi-conditioning of a diffusion model by utilizing both image attributes (e.g., satellite weather image features and topographic features) and semantic layouts (e.g., some surface weather observations). Satellite images for the matching location, date, and time can be used in some examples. In addition, topographical information of the matching location can be used for conditioning, including proximity to water bodies, altitude, type of terrain, vegetation, and/or level of built-up for areas surrounding the matching location in all directions. Surface weather observations, such as temperature, humidity, rainfall amount, wind speed, wind direction, barometric pressure, dew point, and cloudiness may also provide additional attributes for conditioning. In some embodiments, what-if scenarios can be created during conditioning by modifying the topographical information and one or more surface weather observational values. Thus, from the generated virtual WSR images, and with limited actual surface weather observations and satellite images of the matching location, some embodiments of the disclosure can assimilate this information to create climate profiles and other weather predictions.

Figure 3A:
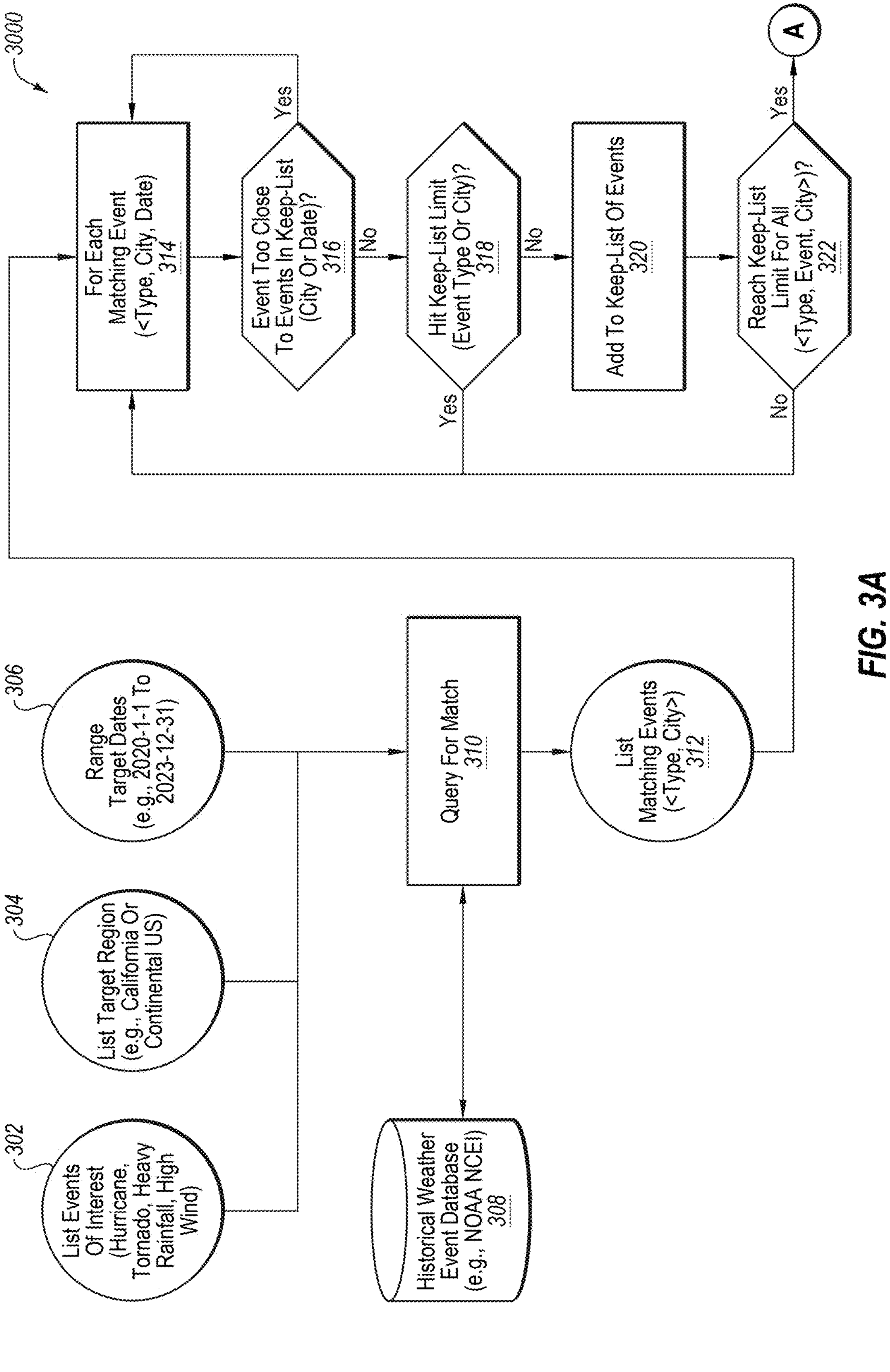
FIGS. 3A and 3B illustrate a flow chart of an example method for selecting one or more events of interest for training an artificial intelligence radar image generation machine learning model, arranged in accordance with at least one embodiment of the present disclosure.
Figure 3B:
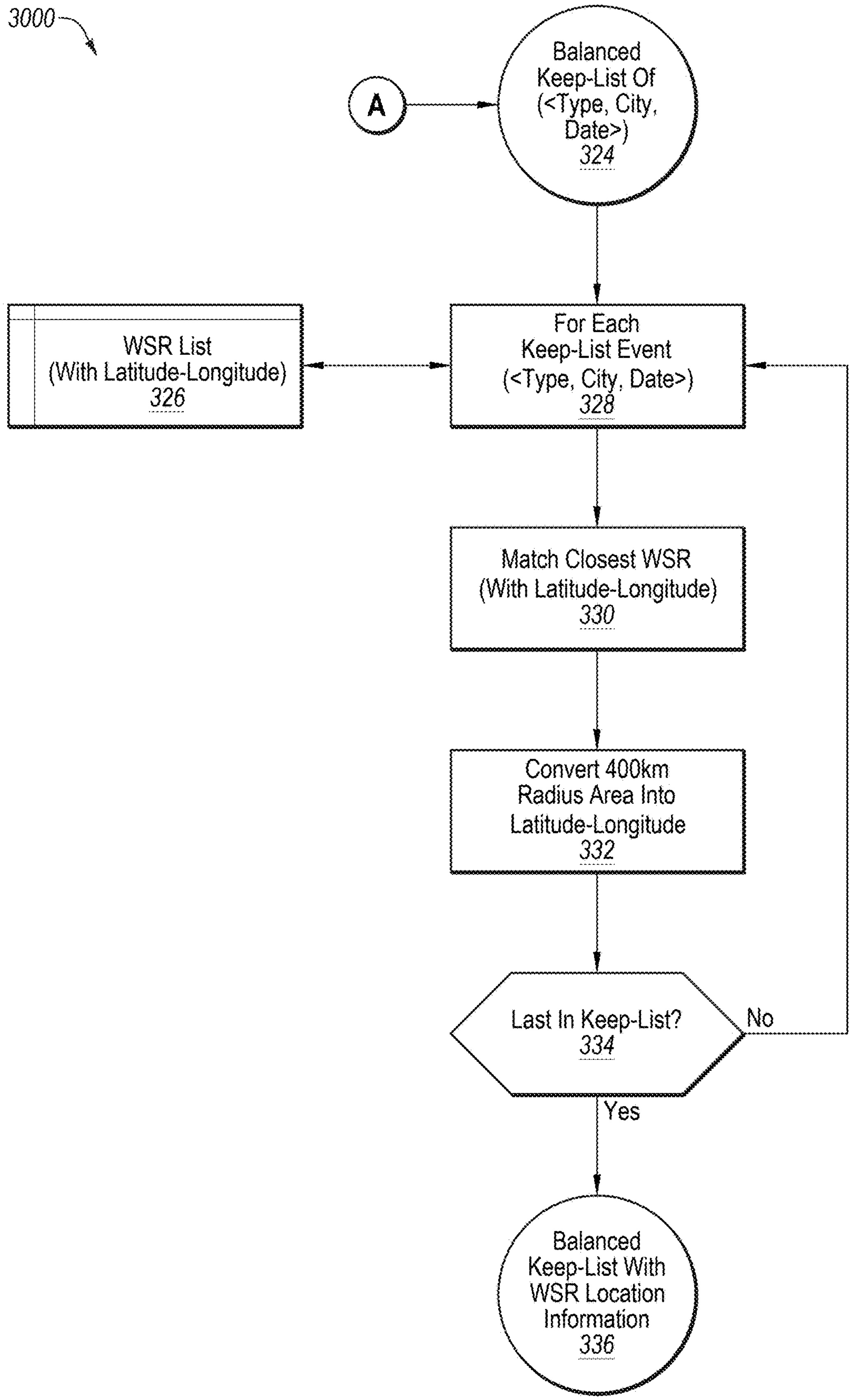

FIGS. 3A and 3B illustrate a flow diagram 3000 of an example method for selecting one or more events of interest for training an artificial intelligence radar image generation machine learning model, arranged in accordance with at least one embodiment of the present disclosure. This example method may be used in event selector 202 in FIG. 2 to generate an appropriate list of events of interest for training. In some embodiments, it can be useful to curate the subset of information from different sources of weather information (e.g., WSR images, geostationary satellites, polar orbital satellites, and ground stations) to obtain a balanced training set, while maintaining coverage of variations of weather events and differences in locations. For example, the type of weather events for a location can be very imbalanced (e.g., severe weather events in Los Angeles include many high-wind incidences). In addition, the events in severe weather databases can be duplicated in different counties or locations covered by the same WSR, so deduplication may be performed.

In some embodiments, WSR images used to train the AI radar image generation machine learning model are selected by one or more criteria, including (1) a list of weather events of interest 302, (2) a list of regions of interest 304, and (3) a date range 306. As discussed above with respect to FIG. 2, the weather event search results 208 are used to query the weather data repositories 204 and the geographic data repositories 206 at the data repository query and data selection module 210. In some embodiments, the criteria are queried in operation 310 in one or more historical weather events databases 308, e.g. (NOAA's NCEI) to generate a list of matching events 312 classified by event type, city or county, and date of occurrence.

Matching events list is then analyzed in operations 314, 316, 318, 320, and 322 to determine a balanced keep-list of events of interest for training the AI radar image generation training model. In one example, in operation 316, since events in the NCEI database are recorded by the county in the United States where the event occurred, there could be duplicate entries that need to be removed if the event is recorded in multiple counties. In addition, operation 316 can further review whether a single weather event can have multiple reporting, especially for long running events. In one example, entries that are too close together in time (e.g., within the same 24-hour time period) can be collapsed into a single event. In operation 318, the method evaluates whether the list of events is balanced among the product of event type and city to mitigate bias in the training data. For example, statistically there are a lot of high wind events compared to other types of weather events (e.g., tornadoes or hurricanes). If the list is balanced (e.g., within a specified limit for an event type or a city) it is added to the event keep list at operation 320, otherwise if the limit is exceeded, the method 3000 proceeds to evaluate the next event in the list back at operation 314.

In some embodiments, once the keep list limit is reached at operation 322 for all weather event types, weather events, and cities, in the available or target date range, then the resulting balanced keep list 324 is analyzed at operation 328 for each event in the keep list. For each event in the keep list, the closest WSR by distance is identified at operation 330, and converted to latitude and longitude at operation 330 to add to the WSR list 326. Since the range of WSR radar is 200 nautical miles, a square box containing 400 km radius area around the WSR is identified at operation 330, and converted to latitude and longitude, to facilitate the correlation with satellite images (which are in latitude and longitude). In addition, for different latitudes, the same 800 km width of the box can cover different degrees of longitude (e.g., for a lower latitude near the equator, each longitude degree covers more kilometers of distance than the higher latitudes near the North or South Poles). In response to all the events in the keep list being evaluated at operation 334, then a balanced keep list with complete WSR location information and square box latitude-longitude information is produced at operation 336.

Note that in some examples, for some WSR locations, topographical constraints may make the data non-usable (e.g., WSR name KVTX in Los Angeles is blocked by mountains in the north). Furthermore, in some examples for other WSR location, the location is too close to a boundary for satellite coverage (e.g., the 400 km radius around WSR name KATX in Seattle does not have any GOES image coverage in the north). In both of these cases, the WSR can be removed from the keep list of target regions for training the AI radar image generation model.

Figure 4A:
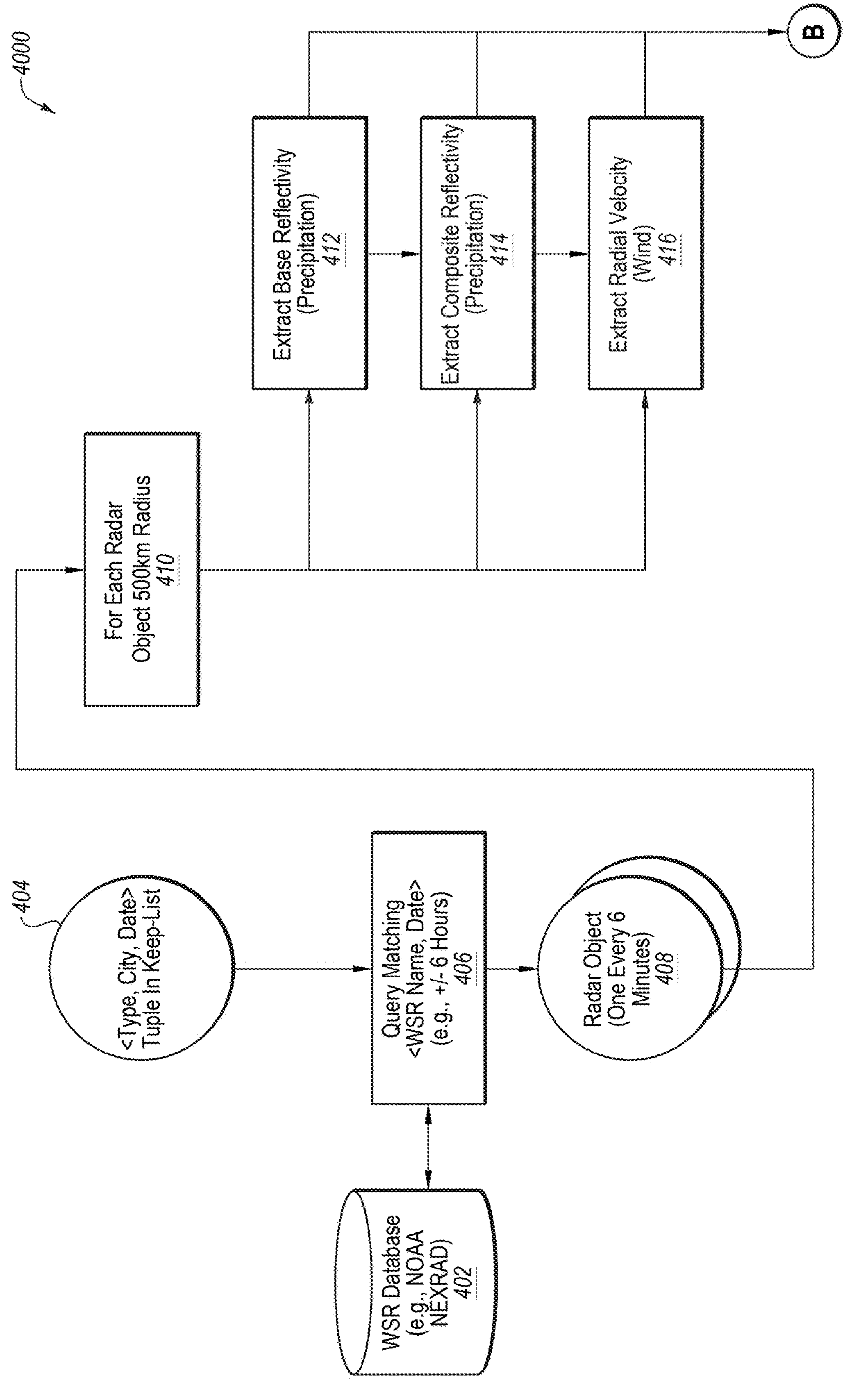
FIGS. 4A and 4B illustrate a flow diagram of an example method for selecting one or more weather surveillance radar (WSR) images of interest for training an artificial intelligence radar image generation machine learning model, arranged in accordance with at least one embodiment of the present disclosure.
Figure 4B:
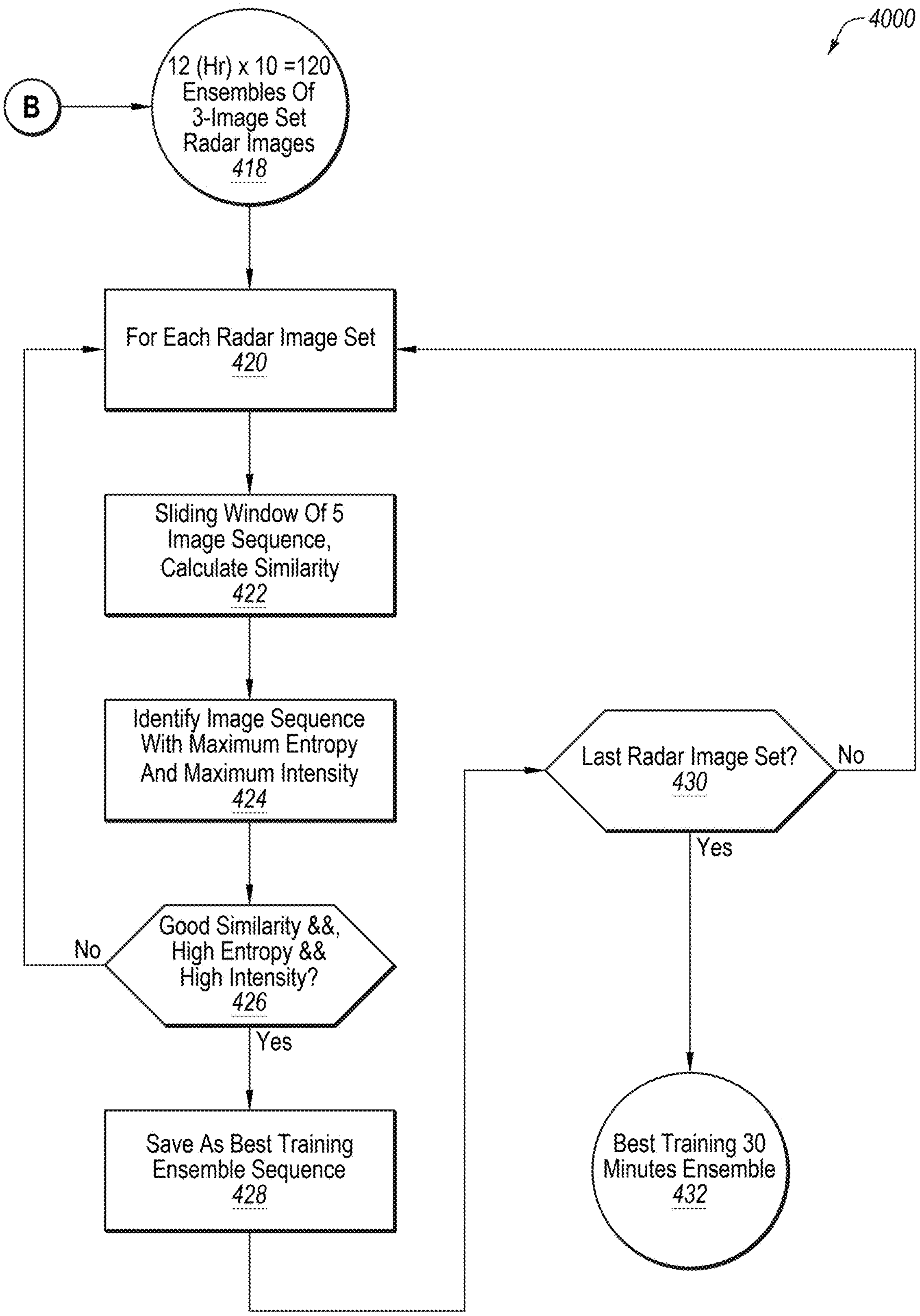

FIGS. 4A and 4B illustrate a flow chart of an example method 4000 for selecting one or more weather surveillance radar (WSR) images of interest for training an artificial intelligence radar image generation machine learning model, arranged in accordance with at least one embodiment of the present disclosure. In some embodiments, this method 4000 can be used in association with WSR image processor 212 in FIG. 2 to time align the weather events reported in the historical weather event database (e.g., NOAA's NCEI) with actual recorded WSR images 218 in FIG. 2. For each event in the keep list from the event selector 202 (e.g., the keep list shown at 404 in FIG. 4A), the WSR name and date are queried at operation 406 in the historical WSR database 402. In addition, as weather systems can move across the coverage area over time, for example, the most pronounced characteristics of the weather system may not coincide with the location of the reported event, which is commonly in higher populated areas. In some embodiments, at operation 406, to add to the time dimension of the learning data, all WSR image data objects within +/−4, 6, 8, 10, 12 or some other number of hours of the event are examined.

For the purpose of finding matching images 408, in one example, the reporting location of the event can be anywhere within an 800×800 km box around the WSR, which can correspond to a WSR range of coverage, where WSR images are recorded about once every 6 minutes. In another embodiment, radar objects within a 500 km radius of an event can generate a match for the event at operation 410. At operation 412, for a WSR radar image data object, a base reflectivity radar image is extracted for a measure of precipitation. At operation 414, for the WSR radar image data object, a composite reflectivity radar image is extracted for a second measure of precipitation. At operation 416, for a WSR radar image data object, a radial velocity radar image is extracted for a measure of wind. Thus, in some embodiments, at 418, 12 (hr)×10 (radar images per hour)=120 ensembles of 3-image sets of radar images are generated for each event.

Then at operation 420, each radar image set from the ensemble sets at 418 for an event are analyzed to identify a sliding window time sequence of 5 image sets (e.g. 30-minute sliding window) for the event that is most suitable for training based on one or more criteria. Using a sliding window analysis on the ensemble sets can be helpful in some examples because a reported event's time and location may not match the time and location on the WSR images for weather analysis purposes. Thus, a sliding window analysis can be conducted in some embodiments to help find the most relevant WSR images matching the specified weather event. At operation 422, similarity of images within each of the sliding window sequences is calculated to help determine whether the weather event is a recording aberration, as a higher similarity within the sequence may show that the event is pervasive and real, and not an aberration. At operation 424, the image sequence is evaluated to determine the intensity of the values (e.g., base reflectivity, composite reflectivity, and radial velocity indicating that the weather event has heavy precipitation and/or strong wind), and the entropy of the weather system (e.g., the weather event is affecting a wide area). At operation 426, the image sequence or sequences with good similarity, high entropy and high intensity are determined, and if the sequence satisfies one or more predetermined thresholds of similarity, entropy, and intensity values, it can be saved at operation 428 as a training ensemble sequence. The process continues at operation 430 until all sliding window image sets are evaluated at operation 420-428. The result is one or more ensemble training sets 432 in some examples. While the method 4000 is described herein primarily in connection with WSR image data located in the United States, it is also applicable to WSR image data located in areas outside the United States. For example, method 4000 may be applied to WSR image data from the Operational Program for Weather Radar Information (OPERA) operated by the European National Meteorological Services (EUMETNET). Method 4000 may also be applicable to WSR image data from JAXA operated by the JMA in Japan, or any other WSR image data in any other jurisdiction or location.

Figure 5A:
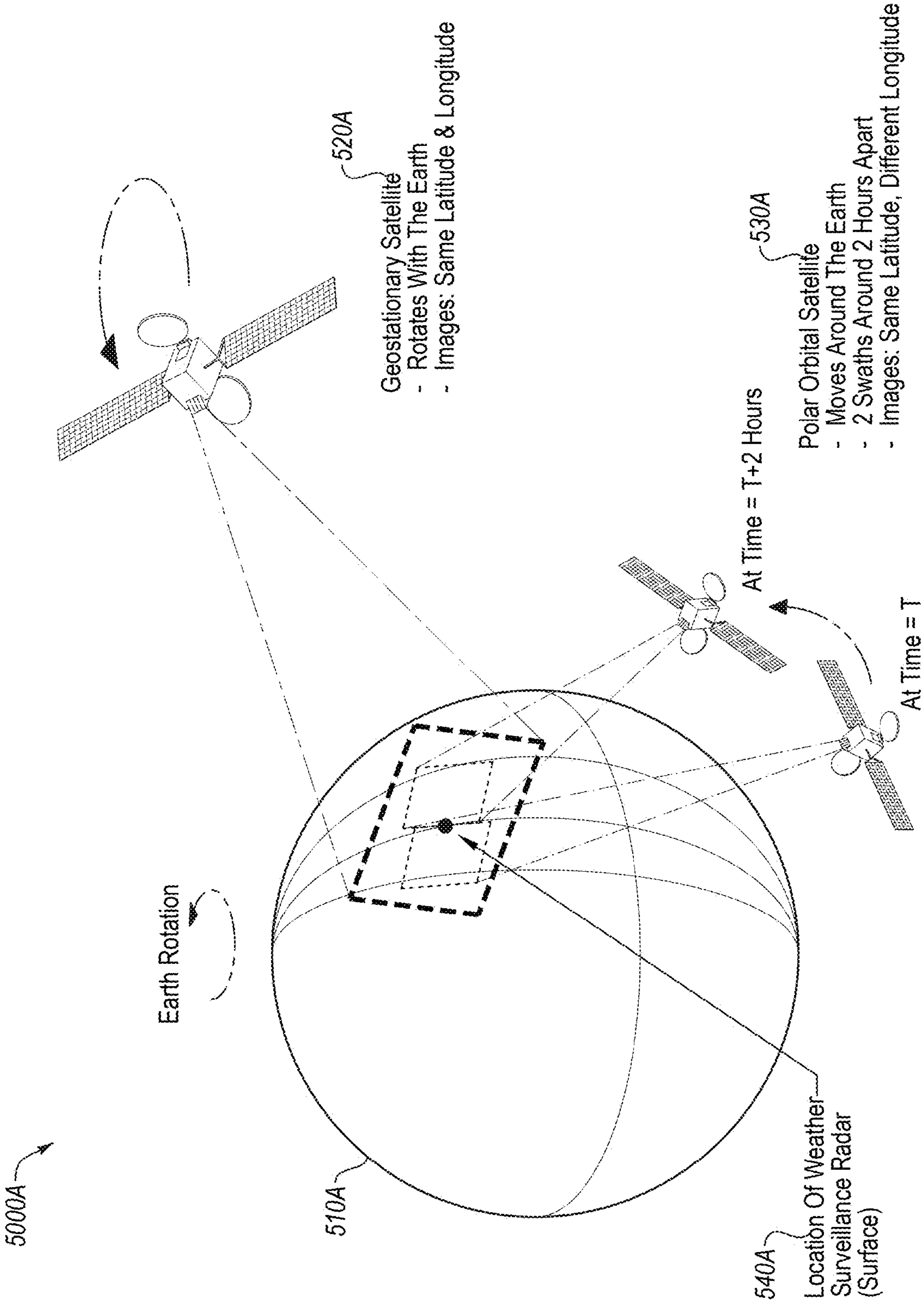
FIG. 5A illustrates an example diagram of image capture of the Earth's surface by a geostationary satellite and by a polar orbital satellite in orbit relative to a location of a weather surveillance radar, arranged in accordance with at least one embodiment of the present disclosure.

FIG. 5A illustrates an example diagram 5000A of how satellite images are captured of the Earth's surface by a geostationary satellite and by a polar orbital satellite in orbit relative to a location of a weather surveillance radar, arranged in accordance with at least one embodiment of the present disclosure. In some embodiments, the geometry of the images from these two kinds of satellite are determined at least in part by the geometry of the earth (or other body) 510A around which the satellite rotates. For example, a geostationary satellite 520A rotates with the earth at the same rate, so the geostationary satellite stays relatively stationary over a particular area of the earth, and the satellite images produced by a geostationary satellite will tend to have the same or similar latitude and longitude. Since the geostationary satellite is approximately 22,236 miles from the Earth's surface, it covers a very large area, much larger than the WSR image which is approximately 800 km×800 km. Furthermore, the shape of the image (similar to, but not quite a parallelogram) is very different from the alignment on the ground at the WSR location 540A (e.g., a square).

Polar orbital satellite 530A, in some examples, moves around the Earth, but at a much closer distance of 512 miles from the Earth's surface. The polar orbital satellite images cover the same latitude but different longitudes as it orbits the Earth. In one example, the polar orbital satellite 530A generates 14 swaths that cover the whole Earth twice a day. A given WSR location 540A can be in one or two swaths, which are captured around 2 hours apart. In the two-swath case, the images are two (near) parallelograms that are slightly overlapped. In some embodiments, functions based on the Python package satPy are implemented to regenerate rectangular images based on the swath or swaths and specific latitudes and longitudes, with algorithmic adjustments needed to use the function calls properly to create desired image alignments. The Satpy package is a python library for reading and manipulating meteorological remote sensing data and writing it to various image and data file formats. Satpy comes with the ability to make various RGB composites directly from satellite instrument channel data or higher-level processing output. For geostationary satellite images, since the images are captured from the stationary position of the geostationary satellite, the Satpy package can be used to obtain successive satellite images, which can be cropped using Satpy to conform to the latitude-longitude boundary of the interested location (e.g., +/−3 miles around NEXRAD WSR satellite location KMUX). In some examples, the cropped result is a parallelogram, which can be sheared using an image manipulation tool like GIMP into an appropriate shape (e.g., rectangle). For polar orbital satellite images, the location of interest (e.g., around the WSR satellite location) can span several snapshots (swaths) from different angles. Since these snapshots (swaths) generally contain latitude-longitude information, Satpy is used to calculate which swaths pass the desired locations, join the appropriate swaths, then crop and shear the images to the desired shape and size.

Figure 5B:
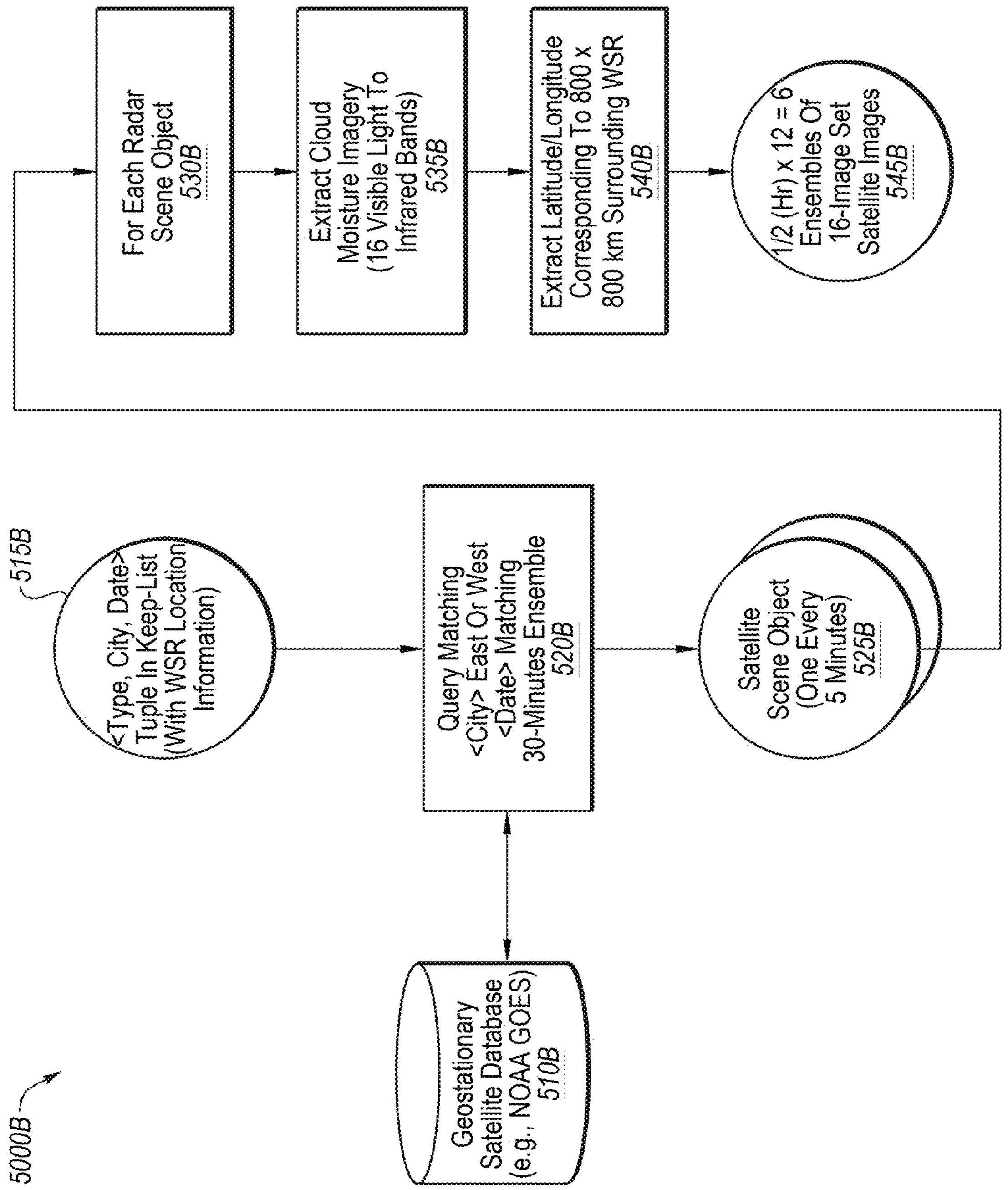
FIG. 5B illustrates a flow diagram of an example method for selecting one or more geostationary satellite images to align by time or by geospatial location with one or more weather surveillance radar (WSR) images of interest for training an artificial intelligence radar image generation machine learning model, arranged in accordance with at least one embodiment of the present disclosure.

FIG. 5B illustrates a flow diagram of an example method 5000B for selecting one or more geostationary satellite images to align by time or by geospatial location with one or more weather surveillance radar (WSR) images of interest for training an artificial intelligence radar image generation machine learning model, arranged in accordance with at least one embodiment of the present disclosure. In some embodiments, for each event in the keep list 515B, having event type, city/location, date, and WSR location information, the date is queried at operation 520B in the appropriate historical GOES database 510B of geostationary satellite images for the specified location. In the United States, one GOES database covers the locations on the West Coast, and a second GOES database covers the locations on the East Coast in in the Central U.S. Operation 520B retrieves at 525B satellite scene objects matching the 30-minute ensembles from the WSR image processor. In one example, geostationary satellite image objects are recorded about once every 5 minutes. At operation 530B, for each scene object retrieved, in one example, 16 images from the Cloud and Moisture Imagery Product (CMIP) of the Advanced Baseline Imager (ABI) are extracted at operation 535B. Each image corresponds to one band of a range of wavelengths ranging from visible to infrared bands. Latitude and longitude values are extracted corresponding to the 800 km×800 km area corresponding to the WSR radar image coverage range at operation 540B, and the geostationary satellite images are cropped to match the WSR image, to yield 6 ensembles of 16-image sets of geostationary satellite images 545B for learning conditioning.

In some embodiments, images other than the cloud and moisture images described above may be created by the same sensor or other sensors available on the satellite (e.g., to measure air quality, temperature, lightning, etc.), and method 5000B can also be applicable to such other types of images. Embodiments of the disclosed method are applicable in a similar fashion to WSR and geostationary satellite image data outside the United States, such as, e.g., the Meteosat and Metop satellites operated by the European Organisation for the Exploitation of Meteorological Satellites (EUMETSAT), or other geostationary satellites operated by Russia, Japan, India, China or other countries.

Figure 5C:
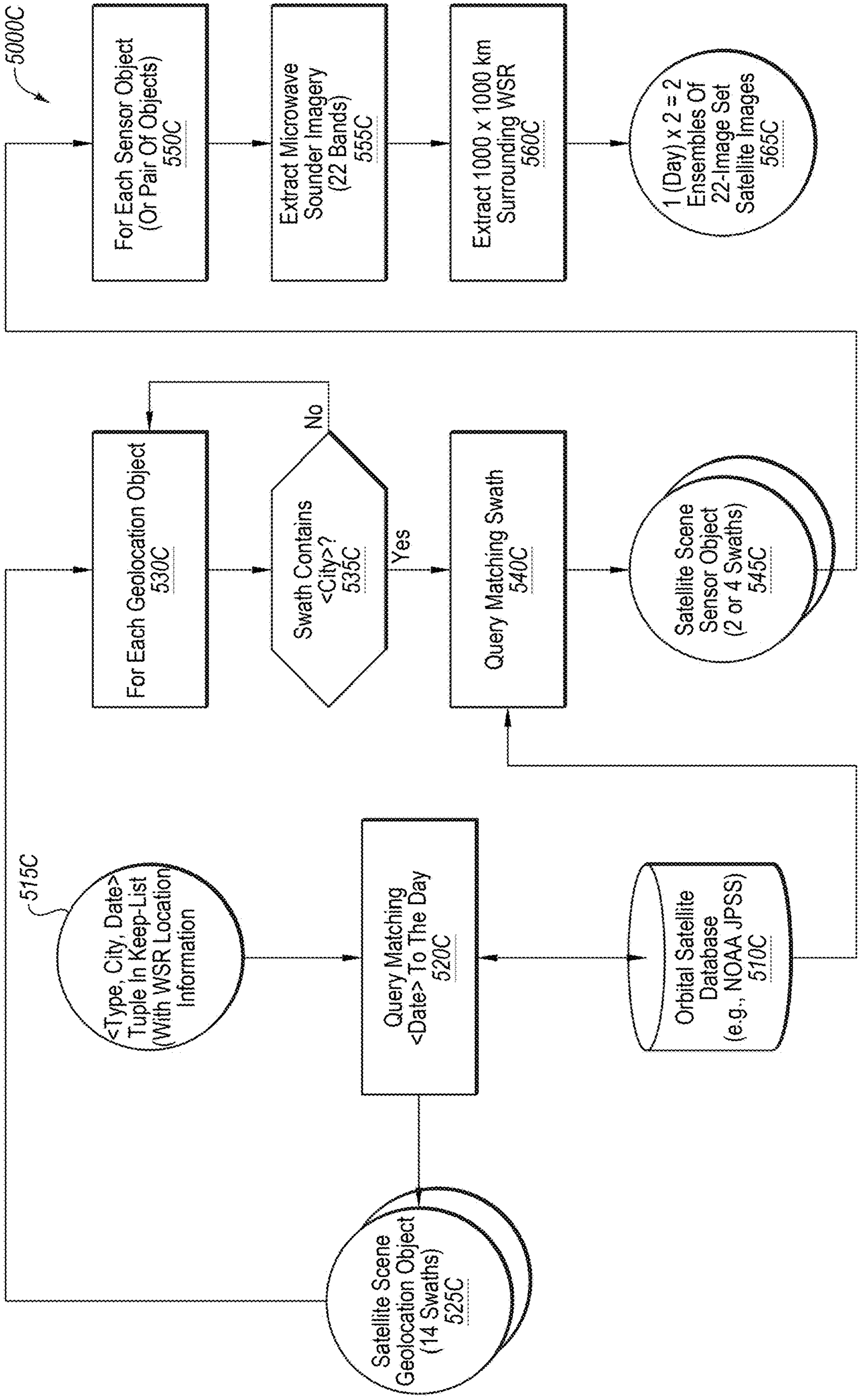
FIG. 5C illustrates a flow diagram of an example method for selecting one or more polar orbital satellite images to align by time or by geospatial location with one or more weather surveillance radar (WSR) images of interest for training an artificial intelligence radar image generation machine learning model, arranged in accordance with at least one embodiment of the present disclosure.

FIG. 5C illustrates a flow diagram of an example method 5000C for selecting one or more polar orbital satellite images to align by time or by geospatial location with one or more weather surveillance radar (WSR) images of interest for training an artificial intelligence radar image generation machine learning model, arranged in accordance with at least one embodiment of the present disclosure. In some embodiments, for each event in the keep list 515C, having event type, city/location, date, and WSR location information, the date is queried at operation 520C in the appropriate historical JPSS database 510C of polar orbital satellite images. Polar orbital satellite image objects 525C matching the specified day from the WSR images of interest are retrieved, showing approximately 14 swaths. At operation 530C, each geolocation object (e.g., swath) 525C is matched with the latitude and longitude values corresponding with the WSR location at operation 535C. Next, at operation 540C, the satellite scene sensor object or objects 545C (generally, e.g., 2 or 4 swaths) containing the latitude and longitude values of the WSR location are selected and retrieved from the historical orbital satellite image database (e.g., NOAA JPSS) 510C. The matching scene 545C can be in one or two satellite swaths. At operation 550C, the sensor objects are examined, and at operation 555C, in one example, 22 microwave sounder images of Brightness Temperature from the Advanced Technology Microwave Sounder (ATMS) corresponding to a range of wavelengths in the microwave range are extracted, since microwaves can pierce through clouds. Latitude and longitude values are extracted corresponding to the, e,g., 1000 km×1000 km area corresponding to the WSR radar image coverage range at operation 560C, and the geostationary satellite images are selected to match the WSR image, to yield 2 ensembles of 22-image sets of polar orbital satellite images 565B for learning conditioning.

In some embodiments, images other than the microwave sounder imagery described above may be created by the same sensor or other sensors available on the satellite (e.g., to measure air quality, moisture, cloud cover, temperature, lightning, etc.), and method 5000C can also be applicable to such other types of images. Embodiments of the disclosed method are applicable in a similar fashion to WSR and polar orbital satellite image data outside the United States, such as, e.g., the Meteosat and Metop satellites operated by the European Organisation for the Exploitation of Meteorological Satellites (EUMETSAT), and satellites operated by Russia, India, China, or other countries.

Figure 6:
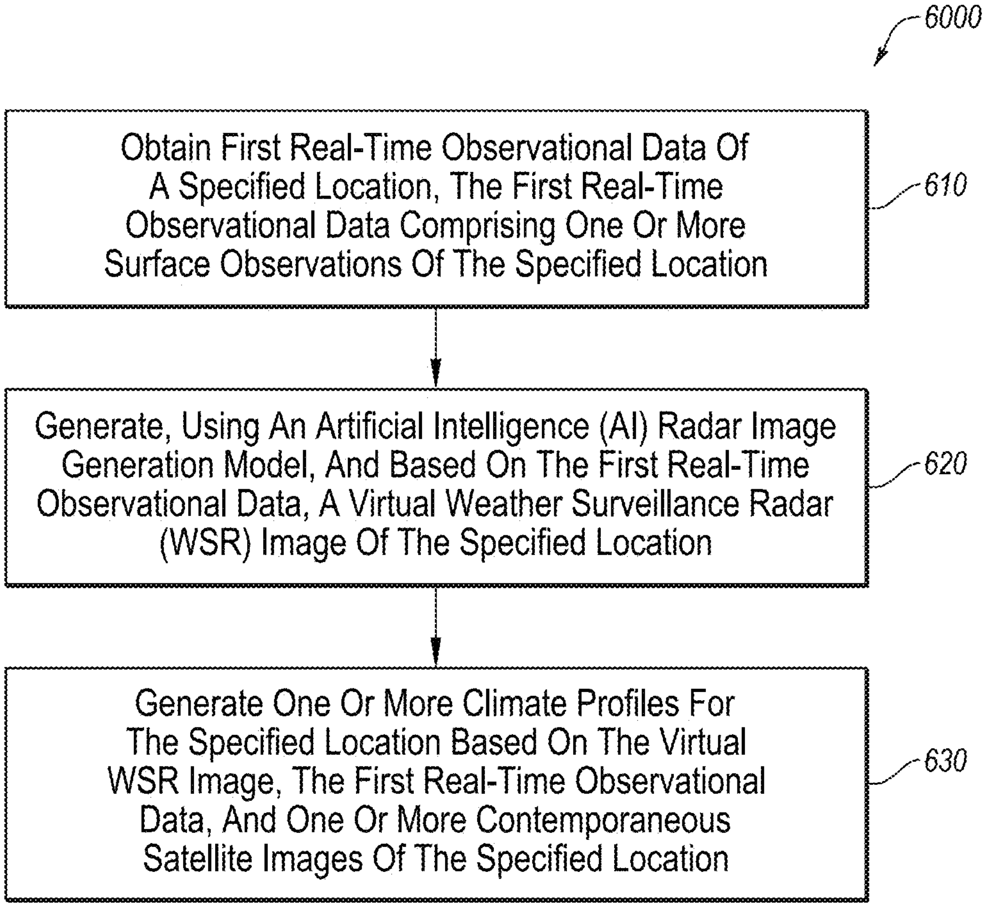
FIG. 6 illustrates an example method of generative weather imaging and climate prediction, arranged in accordance with at least one embodiment of the present disclosure.

FIG. 6 illustrates a flow chart of an example method 6000 of generative weather imaging and climate profiling, arranged in accordance with at least one embodiment of the present disclosure. One or more operations of the method 300 may be implemented by any suitable system such as the process 1000 of FIG. 1, process 2000 of FIG. 2 and/or computing system 7000 of FIG. 7. Although illustrated as discrete steps, various steps of the method 6000 may be divided into additional steps, combined into fewer steps, or eliminated, depending on the desired implementation. Additionally, the order of performance of the different steps may vary depending on the desired implementation. In some embodiments, the method 6000 may be described with respect to one or more specified locations. In some embodiments, the specified location may be in located in an area anywhere in the world, including an area that does not have weather surveillance radar (WSR) coverage with Doppler radar equipment.

In some embodiments, the method 6000 may include a block 610. At block 610, first real-time observational data of a specified location can be obtained. The first real-time observational data can include one or more surface observations of the specified location. In some embodiments, the surface observations can include one or more of temperature, humidity, rainfall amount, wind direction, pressure, dew point, or cloudiness. In some embodiments, the surface observations can include topographical information associated with areas in, on or surrounding the specified location including at least one of proximity to water bodies, altitude, terrain, vegetation, or level of built-up.

At block 620, a virtual weather surveillance radar (WSR) image of the specified location is generated using an artificial intelligence (AI) image generation model. In some embodiments, the virtual WSR images are based on actual WSR images extracted from historical Doppler radar data and can be generated on areas that have no existing Doppler radar coverage. Such virtual WSR images can be conditioned to match desired weather events and static parameters, including one or more of season, location, topography, and land-water vicinity.

At block 630, one or more climate profiles for the specified location can be generated based on the virtual WSR image, the first real-time observational data, and one or more contemporaneous satellite images of the specified location. In some embodiments, the one or more climate profiles may be presented on a user interface to permit a user to interact with the one or more climate profiles. In some embodiments, the user interface may present additional information about the one or more climate profiles or allow the user to adjust the climate profiles by adding or modifying one or more parameters, or changing the specified location, etc.

Modifications, additions, or omissions may be made to the method 6000 without departing from the scope of the disclosure. For example, the operations of the method 6000 may be implemented in differing order. Additionally, or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

For example, the method 6000 may further include obtaining, via the user interface, a user input indicating a selection to obtain second real-time observational data. In some embodiments, the second real-time observational data may correspond to current conditions within one or more specified locations. The user may indicate to obtain the second real-time observational data in response to identifying substantial or noticeable changes in the weather conditions such that new forecasts may be warranted.

In response to the user selection, the second real-time observational data corresponding to the current conditions within the one or more specified locations may be obtained. The AI radar image generation model may generate a second virtual WSR image of the one or more specified locations based on or in consideration of the second real-time observational data. In these and other embodiments, one or more updated climate profiles may be generated.

Figure 7:
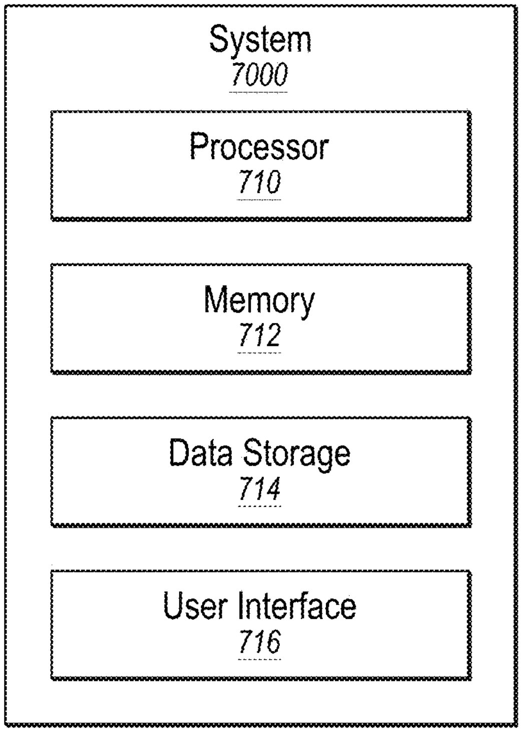
FIG. 7 illustrates a block diagram of an example computing system that may be used with a generative weather imaging and climate prediction system, in accordance with one or more embodiments of the present disclosure.

FIG. 7 illustrates a block diagram of an example computing system 7000 that may be used with a generative weather imaging and climate prediction system, in accordance with one or more embodiments of the present disclosure. For example, the computing system 7000 can be used to generate a weather surveillance radar image and/or a climate profile for a specified location anywhere in the world.

The computing system 7000 may include a processor 710, a memory 712, data storage 714, and a user interface 716. The processor 710, the memory 712, the data storage 714, and the user interface 716 may be communicatively coupled.

In general, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), a graphical processing unit (GPU), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, the processor 710 may include any number of processors configured to, individually or collectively, perform or direct performance of any number of operations described in the present disclosure. Additionally, one or more of the processors may be present on one or more different electronic devices, such as different servers.

In some embodiments, the processor 710 may be configured to interpret and/or execute program instructions and/or process data stored in the memory 712, the data storage 714, or the memory 712 and the data storage 714. In some embodiments, the processor 710 may fetch program instructions from the data storage 714 and load the program instructions in the memory 712. After the program instructions are loaded into memory 712, the processor 710 may execute the program instructions.

The memory 712 and the data storage 714 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The user interface 716 may include any device to allow a user to interface with the computing system 7000. For example, the user interface 716 may include a mouse, a track pad, a keyboard, buttons, camera, microphone, and/or a touchscreen, among other devices. The user interface 716 may receive input from a user and provide the input to the processor 710.

Modifications, additions, or omissions may be made to the computing system 7000 without departing from the scope of the present disclosure. For example, in some embodiments, the computing system 7000 may include any number of other components that may not be explicitly illustrated or described.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:

obtaining first real-time observational data of a specified location, the first real-time observational data comprising one or more surface observations of the specified location;

generating, using an artificial intelligence (AI) radar image generation model, and based on the first real-time observational data, a virtual weather surveillance radar (WSR) image of the specified location, wherein the AI radar image generation model is trained to generate the virtual WSR image using a historical WSR image dataset comprising historical WSR images from one or more pre-selected weather event search results, wherein training the AI radar image generation model includes:

for each of the one or more pre-selected weather event search results, retrieving a sequence of WSR objects from a historical WSR database, wherein the sequence of WSR objects are associated with a nearest WSR by distance, are located within a specified distance of one or more corresponding pairs of location values, and are captured within a specified time frame;

extracting from each of the WSR objects, a base reflectivity radar image, a composite reflectivity radar image, and a radial velocity radar image; and identifying at least one suitable training image sequence from the extracted radar images;

generating one or more climate profiles for the specified location based on the virtual WSR image, the first real-time observational data, and one or more contemporaneous satellite images of the specified location; and presenting the one or more climate profiles to a user interface of a user to permit the user to interact with the one or more climate profiles.

2. The method of claim 1, wherein training the AI radar image generation model comprises:

searching a historical weather event database to generate one or more weather event search results that meet criteria including (1) classification as one or more weather events of interest, (2) where the weather event occurs in one or more target regions, and (3) the weather event occurs during one or more target dates;

generating a balanced subset of the one or more weather event search results, wherein the balanced subset comprises the one or more pre-selected weather event search results; and identifying, for each of the one or more pre-selected weather event search results, the nearest WSR by distance, and the one or more corresponding pairs of location values comprising a latitude value and a longitude value.

3. The method of claim 1, wherein identifying the at least one suitable training image sequence comprises:

for a plurality of WSR objects within a specified time window:

calculating a similarity metric, an entropy metric, and an intensity metric of the extracted radar images; and identifying one or more consecutive WSR objects having a similarity metric that meets or exceeds a specified similarity threshold, an entropy metric that meets a specified entropy threshold, and an intensity metric that meets or exceeds a specified intensity threshold.

4. The method of claim 1, wherein training the AI radar image generation model to generate the virtual WSR image further comprises:

conditioning the AI radar image generation model with one or more types of satellite image data.

5. The method of claim 4, wherein the one or more types of satellite image data comprise at least one of: geostationary satellite image data or polar orbital satellite image data.

6. The method of claim 4, wherein conditioning the AI radar image generation model comprises:

for each of the one or more types of satellite image data, retrieving a sequence of satellite scene objects from a historical satellite image database corresponding to the type of satellite image data, the satellite scene objects aligned with one or more times and locations associated with the one or more pre-selected weather event search results.

7. The method of claim 1, wherein one or more surface observations comprise surface weather observations associated with the specified location including at least one of: temperature, humidity, rainfall amount, wind speed, wind direction, pressure, dew point, or cloudiness.

8. The method of claim 1, wherein one or more surface observations comprise topographical information associated with areas surrounding the specified location including at least one of: proximity to water bodies, altitude, terrain, vegetation, or level of built-up.

9. The method of claim 1, wherein the one or more climate profiles comprise one or more of: tornadoes, hurricanes, typhoons, storms, wind direction, wind velocity, precipitation amount, lightning, precipitation types, temperature, humidity, or cloud coverage.

10. The method of claim 1, further comprising the user adjusting the one or more climate profiles via the user interface by adding or modifying one or more parameters or changing the specified location.

11. A system comprising:

one or more processors configured to perform operations comprising:

obtaining first real-time observational data of a specified location, the first real-time observational data comprising one or more surface observations of the specified location;

generating, using an artificial intelligence (AI) radar image generation model, and based on the first real-time observational data, a virtual weather surveillance radar (WSR) image of the specified location, wherein the AI radar image generation model is trained to generate the virtual WSR image using a historical WSR image dataset comprising historical WSR images from one or more pre-selected weather event search results, wherein training the AI radar image generation model includes:

for each of the one or more pre-selected weather event search results, retrieving a sequence of WSR objects from a historical WSR database, wherein the sequence of WSR objects are associated with a nearest WSR by distance, are located within a specified distance of one or more corresponding pairs of location values, and are captured within a specified time frame;

extracting from each of the WSR objects, a base reflectivity radar image, a composite reflectivity radar image, and a radial velocity radar image; and identifying at least one suitable training image sequence from the extracted radar images;

generating one or more climate profiles for the specified location based on the virtual WSR image, the first real-time observational data, and one or more contemporaneous satellite images of the specified location; and presenting the one or more climate profiles to a user interface of a user to permit the user to interact with the one or more climate profiles.

12. The system of claim 11, wherein training the AI radar image generation model comprises:

searching a historical weather event database to generate one or more weather event search results that meet criteria including (1) classification as one or more weather events of interest, (2) where the weather event occurs in one or more target regions, and (3) the weather event occurs during one or more target dates;

generating a balanced subset of the one or more weather event search results, wherein the balanced subset comprises the one or more pre-selected weather event search results; and identifying, for each of the one or more pre-selected weather event search results, the nearest WSR by distance, and the one or more corresponding pairs of location values comprising a latitude value and a longitude value.

13. The system of claim 11, wherein identifying the at least one suitable training image sequence comprises:

for a plurality of WSR objects within a specified time window:

calculating a similarity metric, an entropy metric, and an intensity metric of the extracted radar images; and identifying one or more consecutive WSR objects having a similarity metric that meets or exceeds a specified similarity threshold, an entropy metric that meets a specified entropy threshold, and an intensity metric that meets or exceeds a specified intensity threshold.

14. The system of claim 11, wherein training the AI radar image generation model to generate the virtual WSR image further comprises:

conditioning the AI radar image generation model with one or more types of satellite image data.

15. The system of claim 14, wherein conditioning the AI radar image generation model comprises:

for each of the one or more types of satellite image data, retrieving a sequence of satellite scene objects from a historical satellite image database corresponding to the type of satellite image data, the satellite scene objects aligned with one or more times and locations associated with the one or more pre-selected weather event search results.

16. The system of claim 11, the operations further comprising adjusting the one or more climate profiles via the user interface by the user adding or modifying one or more parameters or changing the specified location.

17. One or more non-transitory computer-readable media storing instructions that, when executed by one or more processors, cause a system to perform operations, the operations comprising:

obtaining first real-time observational data of a specified location, the first real-time observational data comprising one or more first surface observations of the specified location;

generating, using an artificial intelligence (AI) radar image generation model, and based on the first real-time observational data, a virtual weather surveillance radar (WSR) image of the specified location, wherein the AI radar image generation model is trained to generate the virtual WSR image using a historical WSR image dataset comprising historical WSR images from one or more pre-selected weather event search results, wherein training the AI radar image generation model includes:

for each of the one or more pre-selected weather event search results, retrieving a sequence of WSR objects from a historical WSR database, wherein the sequence of WSR objects are associated with a nearest WSR by distance, are located within a specified distance of one or more corresponding pairs of location values, and are captured within a specified time frame;

extracting from each of the WSR objects, a base reflectivity radar image, a composite reflectivity radar image, and a radial velocity radar image; and identifying at least one suitable training image sequence from the extracted radar images;

generating one or more first climate profiles for the specified location based on the virtual WSR image, the first real-time observational data, and one or more contemporaneous satellite images of the specified location; and presenting the one or more climate profiles to a user interface of a user to permit the user to interact with the one or more climate profiles.

18. The non-transitory computer-readable media of claim 17, wherein the operations further comprise:

obtaining second real-time observational data of the specified location, the second real-time observational data comprising one or more second surface observations of the specified location;

generating, using the AI radar image generation model, and based on the second real-time observational data, a virtual weather surveillance radar (WSR) image of the specified location; and generating one or more second climate profiles for the specified location based on the virtual WSR image, the second real-time observational data, and one or more contemporaneous satellite images of the specified location.

* * * * *